Jan. 28, 1958    L. F. VIXLER ET AL    2,821,261
METHOD AND MEANS FOR FILTERING GAS
Filed May 27, 1957

INVENTORS
LESLIE F. VIXLER, &
ROBERT C. WEAST
BY
RICHEY, WATTS, EDGERTON & McNENNY
ATTORNEYS

2,821,261

METHOD AND MEANS FOR FILTERING GAS

Leslie F. Vixler, Rocky River, and Robert C. Weast, Cleveland Heights, Ohio

Application May 27, 1957, Serial No. 661,960

1 Claim. (Cl. 183—45)

This application is a continuation-in-part of our prior application, Ser. No. 587,584, filed May 28, 1956, and now abandoned.

This invention relates to a new and novel filtering material and the method of its functioning for removing fine dust and foreign particles present in gas streams.

We have discovered that greatly increased efficiency of gas filters may be attained by using filter fibers of a high dielectric character, unadulterated by any included elements of low dielectric properties. Remarkably improved functions of our new filter are set forth in the following specification.

For many years the gas industry has been faced with the problem of serious interference with the proper performance of gas appliances, due to the stoppage of the pilot burners and controls caused by foreign material, such as dust and the like, carried in the gas stream. It appears to be practically impossible to eliminate all dust, dirt and foreign particles from a gas distribution system, and therefore the solution rests in the development of various devices which will protect the orifices of gas utilizing devices and appliances, by removing foreign materials from the gas just prior to the gas entering the appliance or prior to the point where it will be burned.

It has been established that dust particles of one micron in diameter and smaller are present at many times in gas distribution systems, and in view of this, it appears advisable to provide filters which eliminate, insofar as possible, dust particles even down to fractional micron sizes. Even a relatively small amount of dust in a gas transmission system, may cause considerable trouble. As a matter of fact, one public utility determined by actual measurement that dust concentration averaging .0310 pound per million cubic feet of gas, was sufficient to cause considerable servicing problems.

It is recognized that the efficiency of a filter depends in a large measure upon the size of the filter fibers, their arrangement, and the extent to which they are compressed. While a filter must be effective in the removal of foreign particles from a gas system, it must be accomplished in such manner that the pressure drop across the filter be so low that it shall not adversely affect the pilot performance. The American Gas Association limits the allowable pressure drop through a filter to one-half inch of water column and the capacity of a filter is determined on this basis. The life of the filter, i. e., the time required for clogging to take place, caused by the foreign materials in the gas, is another factor of importance in evaluating a filter.

A fluid flowing through a conduit may adopt either a straight line or a turbulent type of motion, depending on the velocity of the fluid and the pressure drop through the system. In straight line motion it practically flows in a path parallel to the conduit and no transverse or turbulent or eddy currents are set up. In circular tubes, as the velocity increases, there is a sudden transition at a definite point from this type of flow to turbulent motion, which is characterized by the presence of a multitude of eddy currents. The flow of fluids through a porous media, such as a filter, differs from the flow through tubes, in that the transitional stage in tubes between straight lines and turbulent flow represents a very narrow range, whereas in the flow through porous media, the transition between the straight line and turbulent flow extends over a wide range of flow rates. Most of the problems encountered in dealing with the flow of gas through pipes and controls are confined to turbulent motion, since the critical velocity of the gases is so low as almost never to be found in practice. However, it has been found that in the flow of gases through filters, designed to filter foreign particles from a gas stream, the motion is limited to straight line flow conditions.

Rock wool or slag wool has been used as a filter media for the type of filters used for the purposes described herein. However, such material has been found to contain beads which are apparently unavoidably formed in the commercial manufacture of rock wool and like filter material. Such beads are formed during the cooling of the wool material and frequently there are relatively great irregularities in fiber weight and fiber size, which produces a filter media of non-uniform character due to the presence of formations which serve no filtering function and tend to unduly obstruct the flow of gas. When assembling a filter using such wool, or the like, it is necessary to substantially compress the mass of rock wool and test it after it is inserted in the filter casing in order to properly condition such media for maximum filtering action. The conventional pressed density of such a filter media ranges from 3 to 16 grams per cubic inch and usually is at least 8 grams per cubic inch.

Gas filters heretofore widely used include relatively conductive ingredients which are a part of the chemical composition. For example, typical chemical analysis of rock wool is as follows: $SiO_2$, 31–40%; $Al_2O_3$, 14–15%; CaO, 29–27%; MgO, 15–15%; impurities, 11–3%. The presence of calcium and magnesium oxides in such conventional filtering media precludes retaining any appreciable static electrical charge, and the result is that at all times such a filter has only a relatively low surface electrostatic charge.

In contrast, the essential elements of the filter of the present invention, including any additive or additives in the form of a binder, are all of high dielectric non-conducting character.

When in use, filters produced from rock wool fibers or the like in general depend entirely upon a sieving action to remove the gas-borne dust particles. Such filters are of necessity packed very tightly to produce the numerous fine capillaries in which the dust particles are trapped. With such filter media, it has been found necessary to pack the filter at relatively high densities to produce an efficient filter.

Our present new and novel filter media comprises a felted inorganic oxide mass of material having its very fine fibers oriented in such a manner that an extremely uniform density of fiber filter is provided, and which may be inserted in a filter casing or chamber without appreciably compressing it. Thus, the material offers a relatively low resistance, with the result of an extremely low pressure drop, in the flowing gas stream, in relation to its capacity.

The exclusion of such ingredients as the usual calcium and magnesium oxides, and the forming of a media having only elements of high dielectric character, and in which higher static electrical charge is maintained, is highly advantageous for the following reasons:

The filter of the present invention not only utilizes a sieving action, but, in addition, provides a high electrostatic attraction for the gas-borne particles. Incidental phenomena, including agglomeration and precipitation, along with the attraction and increased adhesion of the gas-borne particles, contribute to the high degree of efficiency and life of our filter media. Our filter is particularly suited for high temperature service.

Objects of the present invention which have been attained in practice are the provision of a gas filter effective for filtering out suspended foreign particles, as small as one micron or less, present in combustible gas flowing to a low consumption rate appliance burner, and while maintaining relatively low pressure drop in the gas line.

Another object is to provide a filter media comprising a pad of fine fibers of uniform size which are free from beads and irregular formations, the fibers being oriented in such a manner that an extremely uniform density filter is provided, without substantially compressing the filter pad when it is assembled in the casing.

Another object is to provide a filter which filters out various small particles including ultramicroscopic particles by both a physical or sieving action in the body of the filter media and by electrostatic attraction and increased adhesion to the surfaces of the fibers.

Other objects are to provide a filter having a very low pressure drop in relation to its capacity, the same being relatively inexpensive to manufacture, sturdy and reliable in operation.

These and other objects will be apparent in the following description.

In the drawings:

Fig. 2 is a central vertical view taken on the line 2—2 of Fig. 1; while

Figure 1:
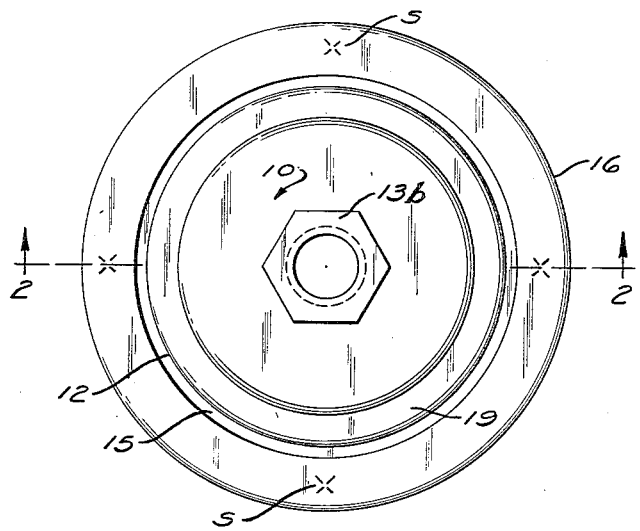
Fig. 1 is a top plan view of an illustrative embodiment of our invention.

The completed filter body or casing, illustrated by the numeral 10, is formed of two cooperating cup-shaped housing members 11 and 12, preferably formed of light gauge metal and adapted to be shaped by a stamping operation, in a well-known manner. Lower housing member 11 is provided with an interiorly threaded inlet connection 13a suitably secured thereto by a brazing or soldering operation at the point indicated by the letter B. Upper housing member 12 is provided with a similar outlet connection 13b, secured thereto in a similar manner at the point indicated by the letter B.

The lower housing member 11 is provided with a relatively wide peripheral flanged portion 14 which is bent around and over a cooperating peripheral flange portion 15 of the upper housing member 12 as indicated at 16 securely locking together the two housing members. In order to prevent relative rotation of the two housing members 11 and 12, suitable spot welding is performed in the upper housing member 12 at spaced points indicated by the letter S.

The housing members 11 and 12 are provided with corresponding flanges 18 and 19, respectively, spaced inwardly of their upper and lower surfaces at substantial distances for a purpose hereinafter described. In assembling the two housing members 11 and 12 to form the completed filter body 10, a pad of filter material 17 of requisite size which may be formed of suitable material such as felted ceramic material may be used. This pad 17 is placed in lower housing member 11 with its lower margins resting on flange 18.

The upper housing member 12 in inverted position is then placed on the peripheral flange 14 of the lower housing member 11 while the upper outer margin of the filter material 17 rests against the flange 19. The outer edge portion of the flange 14 is then bent around and over the outer edge portion of flange 15 of the upper housing member 12 securely locking the parts together as indicated at 16. The disposition and arrangement of the filter pad 17 as provided herein provides spaces 20 below and above the filter pad 17, permitting uniform distribution of the gas over the entire area of the filter pad 17, which is a necessary feature in this type of filter.

Having discovered the functions and relations above described, by the present invention we provide a pad 17 of felted fibrous material of a particular type now commercially available for use as an insulating material. The fibers of our selected material have diameters ranging from 1 to 5 microns, and preferably average 3 microns in diameter. These are combined with a small amount of an adhesive material or binder of relatively high dielectric properties. Such a pad forms a mass of uniform density having surprisingly efficient filtering properties. The chemical analysis of a preferred form of this material is as follows: $SiO_2$, 46–49%; $Al_2O_3$, 46–49%; and additives, 2–8%. The additives are not necessary for the filtering properties and are given as illustrative only of resinous or plastic adhesive material used as a binder for the felted fibrous pad.

The principal ingredients, namely, the silicon oxide and aluminum oxide are highly refractory, and the felt and formation of the filter pad is such that it will maintain its physical self-supporting porous condition. Thus, even though the filter pad had originally included binders which would not withstand high temperatures, nevertheless, even though such binder material were to be dissipated or destroyed at high temperatures, the physical arrangement of the fibers being self-supporting, the filtering by the sieving or entrapping action, supplemented by the attraction effected by the high electrostatic charge and incidental phenomena which have been observed, would not be impaired. However, the use of some small percentage of additives as a binder facilitates handling and shaping of the material for insertion into its housing or chamber, as described.

The filter material of our present invention has been proven most effective to filter out foreign particles of various sizes, including ultramicroscopic particles less than one micron in diameter. As above set forth, the material has a relatively great static surface electrical charge, wherefore it not only utilizes the sieving action, but, in addition, the high electrostatic attraction functions to agglomerate and attract the particles to the filter fibers. These fibers of silicon and aluminum oxides are, as stated, excellent dielectrics, and it has been found that they are very effective in producing an electrostatic precipitation of the gas-borne particles.

In operation, the functions described seem to be well supported by observation and tests of the efficiency of the filter, indicating clearly that the larger particles are trapped by the sieving action, while the smaller particles are electrically neutralized when passing near or impinging upon the surfaces of the fibers, and are thus precipitated in the filter mass.

The very high efficiency of the filter has led to contemplation of additional incidental functions which may be likened to adsorption and other phenomena which seem to be occurring, and to be related to the relatively high unimpaired and enduring electrostatic surface charge of the filter fibers.

Figure 2:
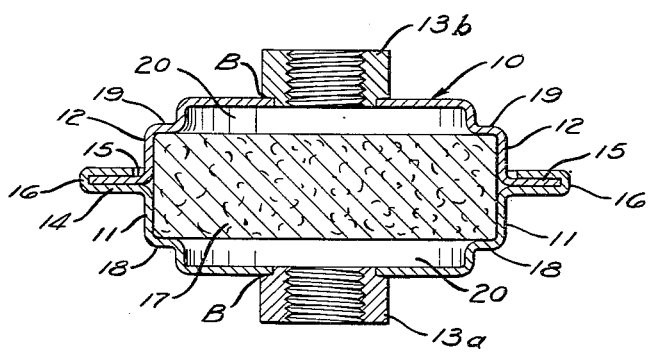
Figure 3:
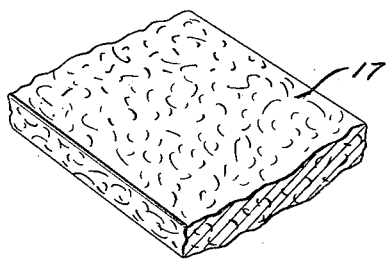
Fig. 3 is a perspective view of the filter media before shaping it for fitting into a housing.

The density of the filter material 17, described herein as manufactured and prepared for use in filters, is six pounds per cubic foot or approximately 1.58 grams per cubic inch. Due to the uniformity of physical and chemical characteristics of such material, it usually is unnecessary to compress the pad material when it is inserted in the filter casing. Thus, if the filter body, as shown in Fig. 2, is ½" in thickness, for example, it may be cut from a pad, such as shown in Fig. 3, of substantially the same thickness. Then density of rock wool commonly used in filters of this type with ½" packing depth for good filtering characteristics is approximately 8 grams per cubic inch. The rock wool, in such adaptations, usually requires packing and testing to produce the desired filtering effects. It follows that the cost of producing a filter using the material herein described is relatively lower than the cost of manufacturing filters using rock wool, as the use of this material permits a smaller quantity of filter material to be used and eliminates the compression operation.

It will be apparent that the functioning of the filtering action comprising essentially two, and perhaps more, related coacting functions, may be considered a method of filtering. Thus, we believe that the operation of our novel filtering media is likewise novel in its combined successive and simultaneous actions upon the minute particles resulting in thoroughly removing them from the slowly moving low pressure gas stream.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

We claim:

A filter for filtering ultramicroscopic particles suspended in a gas stream comprising, a casing including inlet and outlet openings, and felted fibrous material arranged in said casing for the flow of gas therethrough, the fibers of said material having an average diameter of approximately three microns and the material having a density of approximately 1.58 grams per cubic inch and consisting essentially only of the following elements: $SiO_2$, 46–49%; $Al_2O_3$, 46–49%; and additives 2–8% of dielectric adhesive, whereby filtering of such particles is accomplished by a sieving action of such particles within the body of said filter material and also by electrostatic attraction of the particles to the surfaces of the fibers.

References Cited in the file of this patent

UNITED STATES PATENTS

| | | |
|---|---|---|
| 2,192,968 | Fieser | Mar. 12, 1940 |
| 2,400,719 | Stackhouse | May 21, 1946 |
| 2,520,124 | Chaney et al. | Aug. 29, 1950 |

FOREIGN PATENTS

| | | |
|---|---|---|
| 353,225 | Germany | May 13, 1922 |
| 1,065,315 | France | Jan. 6, 1954 |